US008056962B2

(12) United States Patent
Tauchi et al.

(10) Patent No.: US 8,056,962 B2
(45) Date of Patent: Nov. 15, 2011

(54) ENERGY ABSORBER

(75) Inventors: Hideki Tauchi, Nagoya (JP); Toshihiro Takai, Aichi (JP); Kenichi Mizoguchi, Aichi (JP); Hideki Usami, Aichi (JP); Kazunori Teramoto, Aichi (JP)

(73) Assignee: White Impact Co., Ltd., Nagoya-shi, Aichi (JP)

( * ) Notice: Subject to any disclaimer, the term of this patent is extended or adjusted under 35 U.S.C. 154(b) by 48 days.

(21) Appl. No.: 12/744,038

(22) PCT Filed: Mar. 12, 2010

(86) PCT No.: PCT/JP2010/054221
§ 371 (c)(1),
(2), (4) Date: May 20, 2010

(87) PCT Pub. No.: WO2010/134377
PCT Pub. Date: Nov. 25, 2010

(65) Prior Publication Data
US 2011/0221235 A1  Sep. 15, 2011

(30) Foreign Application Priority Data
May 22, 2009  (JP) .................................. 2009 1 24513

(51) Int. Cl.
*B60R 21/04* (2006.01)
*F16F 7/12* (2006.01)
*B60R 13/02* (2006.01)
(52) U.S. Cl. .................. 296/187.05; 280/751; 428/178; 428/180

(58) Field of Classification Search ................... 188/377; 206/521.1, 564, 565, 591, 594; 220/507, 220/508; 280/748, 751; 296/187.03, 187.05; 428/178, 180
See application file for complete search history.

(56) References Cited

U.S. PATENT DOCUMENTS

| | | | | |
|---|---|---|---|---|
| 3,661,317 | A * | 5/1972 | Noguchi | 206/521.1 |
| 4,088,259 | A * | 5/1978 | Sutton | 206/521.1 |
| 4,993,202 | A * | 2/1991 | Thiel | 52/220.3 |
| 5,399,406 | A * | 3/1995 | Matsuo et al. | 428/57 |
| 5,590,805 | A * | 1/1997 | Knoss et al. | 220/508 |
| 5,636,866 | A | 6/1997 | Suzuki et al. | |

(Continued)

FOREIGN PATENT DOCUMENTS
EP  0 863 056 A1  9/1998
(Continued)

*Primary Examiner* — Glenn Dayoan
*Assistant Examiner* — Paul Chenevert
(74) *Attorney, Agent, or Firm* — Dickstein Shapiro LLP

(57) ABSTRACT

An energy absorber in which an energy-absorbing property in a collision can be set to a predetermined property is provided. An energy absorber (1) which is installed between an auto body panel and an interior member of an automobile, so as to absorb impact energy of a collision includes a base (2) which is fastened between the auto body panel and the interior member; and a plurality of projections (3) which projects from the base and is formed into a hollow conical shape or a hollow circular truncated cone shape, wherein the plurality of projections has different heights and different number of liner convex ribs (4), the rib projecting from an outer circumferential face of the projection and extending from a leading end of the projection to the base, the projections next to each other are not coupled via the rib, and the rib is not provided on a line connecting the centers of the projections next to each other.

10 Claims, 2 Drawing Sheets

U.S. PATENT DOCUMENTS

| | | | |
|---|---|---|---|
| 6,247,745 B1 * | 6/2001 | Carroll et al. | 188/371 |
| 6,443,513 B1 * | 9/2002 | Glance | 293/133 |
| 6,682,128 B2 * | 1/2004 | Carroll et al. | 296/187.03 |
| 6,752,450 B2 * | 6/2004 | Carroll et al. | 296/187.03 |
| 7,404,593 B2 * | 7/2008 | Cormier et al. | 296/187.03 |
| 7,625,023 B2 * | 12/2009 | Audi et al. | 293/134 |
| 7,677,538 B2 * | 3/2010 | Darnell et al. | 267/152 |
| 7,686,181 B2 * | 3/2010 | St-Onge | 220/508 |
| 7,861,488 B2 * | 1/2011 | Giles et al. | 52/783.11 |
| 2005/0133324 A1 * | 6/2005 | Soto Bailon et al. | 188/377 |
| 2009/0272612 A1 * | 11/2009 | Cho | 188/377 |
| 2010/0308621 A1 * | 12/2010 | Kawashima et al. | 296/187.05 |

FOREIGN PATENT DOCUMENTS

| | | |
|---|---|---|
| JP | 50-136582 A | 10/1975 |
| JP | 7-52735 A | 2/1995 |
| JP | 8-91160 | 4/1996 |
| JP | 8-142784 A | 6/1996 |
| JP | 10-250514 A | 9/1998 |
| JP | 2007137288 A * | 6/2007 |

* cited by examiner

ENERGY ABSORBER

CROSS-REFERENCE TO RELATED APPLICATIONS

The present application is based on and claims priority from Japanese Patent Application No. 2009-124513, filed on May 22, 2009.

TECHNICAL FIELD

The present invention relates to an energy absorber which is installed between an auto body panel and an interior member such as a door and a ceiling of an automobile, so as to absorb energy in a collision and the like.

BACKGROUND OF THE INVENTION

In recent years, an energy absorber which absorbs impact energy in an automotive collision, so as to secure the safety of an occupant has been provided in an auto body panel, inside an interior member of an automobile and the like.

There has been proposed in JP H10-250514A an energy-absorbing structure having a base plate and a plurality of hollow cylindrical tubes formed integrally therewith and vertically projecting therefrom. In this energy-absorbing structure, when the energy-absorbing structure is overloaded, the tubes elastically or plastically deform or elastically and plastically deform, so as to absorb energy. Consequently, the impact to an occupant can be reduced.

There has been also proposed in JP H07-52735A an energy-absorbing structure in which ribs are connected to outer circumferential portions of a plurality of hollow bosses (tubes) projecting from a base plate. In this energy-absorbing structure, the energy-absorbing amount at the time of a collision is increased by providing the bosses and the ribs.

BRIEF SUMMARY OF THE INVENTION

In the energy-absorbing structures as described in the above cited prior art references although energy in a collision is absorbed, a function for gradually absorbing energy in a collision is not sufficient. For this reason, a function for gradually reducing energy which is conveyed to an occupant is required because the initial energy is large. In order for these energy-absorbing structures to gradually absorb energy in a collision, it is necessary for the energy-absorbing structures to be set so as to have a property which gradually absorbs energy by elastically or plastically deforming the tube or elastically and plastically deforming the tube.

The present invention has been made in view of the above-circumstances, and an object of the present invention is to provide an energy absorber in which an energy-absorbing property can be set such that the energy of a collision can be gradually absorbed.

In order to achieve the above object, the present invention provides an energy absorber which is installed between an auto body panel and an interior member of an automobile, so as to absorb the impact energy of a collision, including a base which is fastened between the auto body panel and the interior member; and a plurality of projections which projects from the base and is formed into a hollow conical shape or a hollow circular truncated cone shape, wherein the plurality of projections has different heights and a different number of linear convex ribs, the rib projecting from an outer circumferential face of the projection and extending from a leading end of the projection to the base, and the projections next to each other are not coupled by the rib, and the rib is not provided on a line connecting the centers of the projections next to each other.

In the present invention, the projections gradually elastically or plastically deform in a collision, or gradually elastically and plastically deform in a collision, so as to absorb the energy of the collision. Consequently, the impact to an occupant can be reduced. A plurality of projections has different heights, so that a high projection firstly deforms, and then a low projection deforms in a collision. By installing the projections of different height in combination on the base, and forming each projection into a conical shape or a circular truncated shape, the energy-absorbing property can be varied. Thereby, the property can be brought close to an ideal property which gradually absorbs the energy of a collision.

Since the projection includes the linear convex rib which projects from the outer circumferential face of the projection and extends to the base from the leading end of the projection, the rigidity of the projection is increased, and the energy-absorbing amount can be improved when the projection elastically or plastically deforms or the projection elastically and plastically deforms.

By combining the projections having a different number of ribs, the energy-absorbing property can be varied by adjusting the energy-absorbing amount of projection, so that the property can be brought close to an ideal energy-absorbing property.

The rib does not connect the projections next to each other, and is not provided on the line connecting the centers of the projections next to each other. Therefore, even if one projection is collapsed by the plastic deformation, the projection next to that projection does not collapse by the collapsed projection; thus, the projections can individually collapse and absorb energy.

In the energy absorber according to the present invention, the energy-absorbing performance per unit area can be maximized by the present shapes. The energy absorber is formed by vacuum-molding a resin sheet, so that the thickness of the projection and the rib can be reduced. The weight of the energy absorber can be also reduced.

Preferably, the number of ribs and the position of the rib to be provided on the projection are appropriately set.

In the present invention, since the rib is provided on the outer circumferential portion of the projection, the rigidity of the projection can be improved; thus, the energy-absorbing amount can be increased. In addition, the number of ribs and the position of the rib to be provided on the projection can be freely set, so that the energy-absorbing property can be changed by adjusting the energy-absorbing amount of the projection. Consequently, the property can be brought close to an ideal energy-absorbing property. By adjusting the position of the rib, the property can be brought close to an ideal energy-absorbing property relative to an impact from an angle not only from the front relative to the projection.

Preferably, the base, the projections and the rib are formed of a material having a polypropylene as a main material.

In the present invention, since the base, the projection and the rib are formed of a synthetic resin having a polypropylene as a main material, the projection and the rib can be easily formed on the base, and the automotive energy absorber can be easily manufactured. In addition, by forming with a material having a polypropylene as a main material, the weight of the energy absorber can be reduced, and the recycling performance can be improved.

Meanwhile, even if the energy absorber according to the present invention is formed of a material except for a synthetic resin material, a high energy-absorbing performance can be obtained by the present shapes.

Preferably, the base includes a collapse preventing portion which prevents the projection from collapsing.

In the present invention, since the collapse preventing portion which prevents the projection from collapsing is formed on the base, the base does not bend or buckle. Consequently, the projection hardly collapses.

According to the present invention, a plurality of projections provided on the base is in a conical shape or a circular truncated cone shape, and has different heights and also a different number of linear convex ribs projecting from the outer circumferential portion of the projection and extending from the leading end of the projection to the base. The rib does not connect the projections next to each other and is not provided on a line connecting the centers of the projections next to each other. Therefore, the energy-absorbing property can be brought close to an ideal energy-absorbing property which gradually absorbs energy, so that an impact energy can be effectively absorbed in a collision; thus, the impact to be conveyed to an occupant is reduced.

DETAILED DESCRIPTION OF THE INVENTION

Hereinafter, an automotive energy absorber 1 as an energy absorber according to an embodiment of the present invention will be described with reference to FIGS. 1, 2A, 2B.

Figure 1:
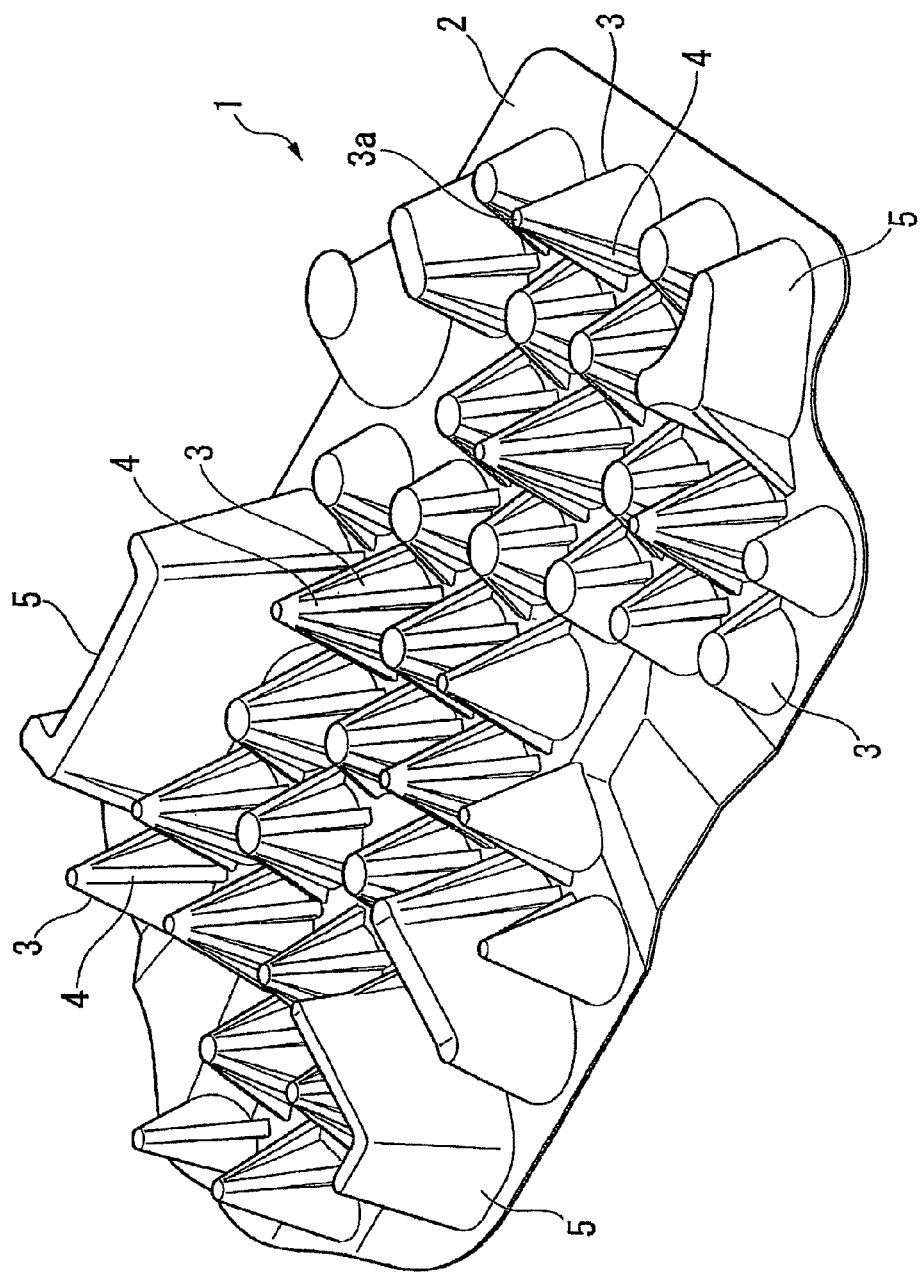
FIG. 1 is a perspective view illustrating one example of an automotive energy absorber according to an embodiment of the present invention.

The automotive energy absorber 1 (resin sheet molding product) according to the present embodiment illustrated in FIG. 1 is installed inside a door of an automobile, between an auto body panel of a ceiling and an interior member, and also installed under a carpet, inside a window frame of a side face of a body and the like, so as to absorb the energy of a collision and the like, and assure the safety of an occupant. The automotive energy absorber 1 includes a base 2 which is fastened to a body, a plurality of projections 3 which projects from the base 2, a rib 4 provided on the outer circumferential face of the projection 3, and a collapse preventing portion 5 which prevents the projection 3 from collapsing.

The base 2 is a member formed in a shape according to a portion of an auto body to which the base 2 is mounted. A plurality of projections 3 is provided on the base, and has a hollow conical shape or a hollow circular truncated cone shape, which project from the base 2. A plurality of projections 3 is not the same in height, and is formed to have several different heights.

The rib 4 makes up a linear convex portion from a leading end 3a of the projection 3 to the base 2, and projects from the outer circumferential face of the projection 3. One or more ribs 4 are provided in one projection 3. The number of ribs provided in a plurality of the projections 3 is not the same, and the number of ribs and the position of the rib 4 are arbitrarily set. The projections 3 next to each other are not coupled via the rib, and the rib is not located on a line connecting the centers of the projections 3 next to each other.

The collapse preventing portion 5 is a member which is formed in the side of a plurality of projections 3 and projects from the base 2. The collapse preventing member 5 is formed to have a width wider than that of the projection 3, and its cross-sectional shape is round, oval, L-shaped, U-shaped and the like according to the shape of the auto body, the base 2 and the projection 3. The height of the collapse preventing portion 5 can be set to higher than the height of the highest projection 3 or lower than the height of the highest projection 3.

The base 2, the projections 3, the ribs 4 and the collapse preventing portion 5, which constitute the automotive energy absorber 1, are an integral structure, and are formed by vacuum-molding a resin sheet made of a polypropylene as a main material. The thickness of the automotive energy absorber is about 1 mm.

By using the resin sheet made of a polypropylene as a main material, the automotive energy absorber 1 can be easily molded, and the weight of the absorber 1 can be reduced. These materials can be obtained at a low price, so that the costs can be reduced, and the recyclability can be improved.

The automotive energy absorber 1 as formed above is installed between an auto body panel such as a door and a ceiling and an interior member of an automobile, under a carpet and the like. In this case, the base 2 is fastened to the body and the interior member by means of a bolt, an adhesion bond and the like, and the direction that the projections 3 project from the base 2 is directed to the car interior side. In addition, the automotive energy absorber 1 can be fastened to an auto body by another method.

When the above-described automotive energy absorber 1 is subjected to an impact of a collision, the projections 3 and the ribs 4 elastically or plastically deform by the impact, or elastically and plastically deform by the impact, so that the automotive energy absorber 1 absorbs the energy. If the projections 3 plastically deform, the projections 3 become buckled and thus collapse In this case, the absorbing property of the automotive energy absorber 1 is adjusted to a predetermined property by adjusting the shape and the height of the conical or circular truncated cone projection 3, the number of ribs 4 and the position of the rib 4.

In the event of a collision, etc., at first, the high projection 3 deforms, and then the low projection 3 deforms, so that the energy-absorbing property can be adjusted because the different height projections 3 are combined. By providing the ribs 4 on the outer circumferential face of the projection 3, the rigidity of the projection is improved, and the energy-absorbing amount can be increased. By varying the number of ribs and the position of the rib 4 to be formed on the projection 3, the energy-absorbing property can be adjusted. Moreover, by adjusting the position of the rib 4 to be formed on the projection 3, the energy can be absorbed relative to impact from an angle not only from the front relative to the projection.

Furthermore, by providing the collapse preventing portion 5, the automotive energy absorber 1 does not easily bend or buckle, so that the projections 3 become collapse-resistant projections.

The energy-absorbing property of the automotive energy absorber 1 according to the present embodiment is adjusted as follows.

Figure 2A:
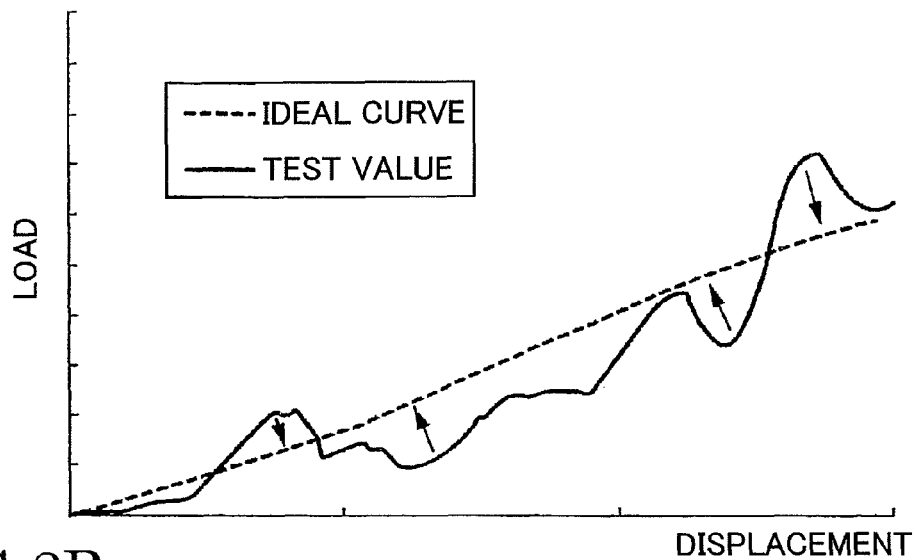
FIG. 2A is a view illustrating a relationship between the load and displacement of the automotive energy absorber according to the embodiment of the present invention.

At first, the property of the load and displacement is brought close to the ideal curve illustrated in FIG. 2A. The test value in FIG. 2A is the property of the load and the displacement of the automotive energy absorber 1 in the process of adjusting the energy-absorbing property. The different height projections 3 are mixed by varying the heights of the projections of the automotive energy absorber 1, so that the property of load and displacement is brought close to the ideal curve illustrated in the figure.

Figure 2B:
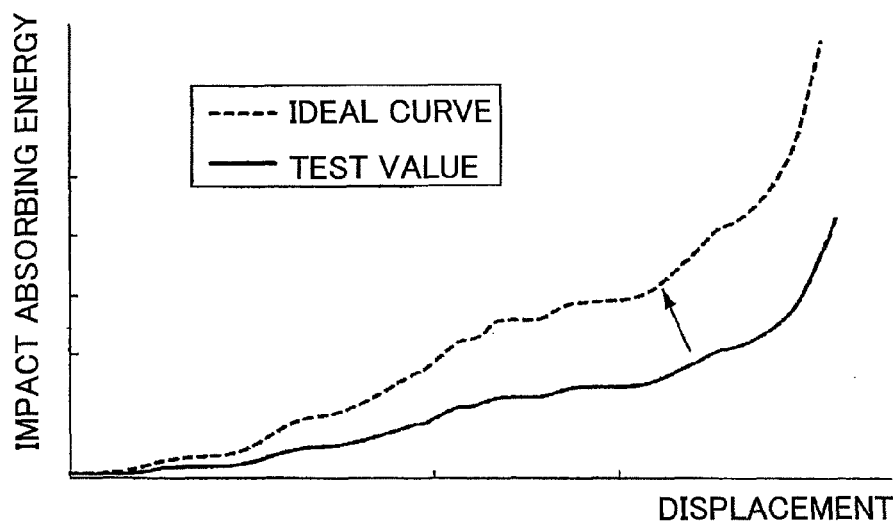
FIG. 2B is a view illustrating a relationship between the impact absorbing energy and displacement of the automotive energy absorber according to the embodiment of the present invention.

Next, the property of impact energy and displacement is brought close to an ideal curve illustrated in FIG. 2B. The test value in FIG. 2B is the property of the impact energy and displacement of the automotive energy absorber 1 in the process of adjusting the energy absorbing property. The number of ribs and the position of the rib 4 to be provided on the outer circumferential face of the projection 3 are adjusted, so that the test value is brought close to the ideal curve.

Next, the function of the above-described automotive energy absorber 1 will be described with reference to the drawings.

In the automotive energy absorber 1 of the present embodiment, the different height projections are combined without equalizing the heights of the projections 3, and the projections are formed into conical shapes or circular truncated cone shapes. Consequently, the energy absorbing property can be varied.

Since the rib 4 is provided on the outer circumferential face of the projection 3, the rigidity of the projection 3 can be improved; thus, the energy-absorbing amount can be increased. By combining the projections 3 having different energy-absorbing amounts, the energy-absorbing property can be varied.

Moreover, by adjusting the position of the rib 4, the energy can be absorbed relative to an impact from an angle not only from the front relative to the projection.

Furthermore, since the rib 4 is formed in each projection 3, and do not connect the projections 3 next to each other, the projections 3 are individually collapsed in a collision. Therefore, the energy-absorbing force can be easily adjusted. Even if one projection 3 is collapsed, the projection 3 next to that projection does not absorb energy and is not collapsed by the collapsed projection.

In the above-described automotive energy absorber 1 of the present embodiment, a plurality of projections 3 formed on the base 2 has different heights, and the number of ribs and the position of the rib 4 provided on the outer circumferential face of the projection 3 can be set, so that the energy-absorbing property can be adjusted. In the event of a collision, the energy of the collision can be gradually absorbed, so that the energy which is transferred to an occupant is reduced, and the safety of the passenger can be secured.

Moreover, since the energy-absorbing amount of the projection 3 is increased by providing the rib 4 on the outer circumferential face of the projection 3, the weight of the automotive energy absorber can be reduced.

Although the embodiment of the automotive energy absorber 1 according to the present invention has been described above, the present invention is not limited thereto. It should be appreciated that variations may be made in the embodiment described without departing from the scope of the present invention.

In the above embodiment, the circular truncated cone projections and the conical projections are mixed, but only the circular truncated cone projections 3, or only the conical projections 3 can be formed.

Moreover, in the above embodiment, the collapse preventing portion 5 is provided in the automotive energy absorber 1, but it is not always necessary to provide the collapse preventing portion 5 in the automotive energy absorber 1.

Furthermore, in the above embodiment, the automotive energy absorber 1 is formed by vacuum-molding the resin sheet having a polypropylene as the main material. However, a resin sheet without having a polypropylene as the main material can be used, and also another method without using a vacuum molding method can be used.

As long as the material of the energy absorber of the present invention is a synthematic resin material, the energy absorber of the present invention can be molded with a material, for example, acrylonitrile-butadiene-styrene (ABS) resin, acetate, polycarbonate, polystyrene, polyethylen (low density or high density) polyester, and polyvinyl chloride (PVC). In addition, as a material except the synthetic resin material, a sheet-like metallic material such as aluminum alloy can be used.

The energy absorber of the present invention can be formed by injection molding, vacuum molding, press molding, stamping molding, extrusion molding, blow molding, slash molding, casting, foam molding reaction injection molding (RIM), powder molding and the like.

In the above embodiment, the direction that the projections 3 project from the base 2 is directed to a car interior side when installing the automotive energy absorber in an automobile, the direction of the automotive energy absorber can be varied according to a direction of expected impact.

CROSS-REFERENCE TO RELATED APPLICATION

The present application is based on and claims priority from Japanese Patent Application No. 2009-124513, filed on May 22, 2009, the disclosure of which is hereby incorporated by reference in its entirety.

The invention claimed is:

1. An energy absorber for installation between an auto body panel and an interior member of an automobile, so as to absorb impact energy of a collision, the energy absorber comprising
    a base configured to be fastened between the auto body panel and the interior member; and
    a plurality of projections which projects from the base and is formed into a hollow conical shape or a hollow circular truncated cone shape, wherein the plurality of projections has different heights and different number of linear ribs, one of the ribs projecting from an outer circumferential face of the projection and extending from a leading end of the projection to the base, the ribs of the projections next to each other are spaced apart, and the two adjacent ribs of the projections next to each other are offset from a line connecting the centers of the projections.

2. The energy absorber according to claim 1, wherein the base, the projections and the rib are formed of a material having a polypropylene as a main material.

3. The energy absorber according to claim 1, wherein the base includes a collapse preventing portion which prevents the projection from collapsing.

4. The energy absorber according to claim 1, wherein the number of the ribs and a position of the rib to be provided on the projection are arbitrarily set.

5. The energy absorber according to claim 4, wherein the base includes a collapse preventing portion which prevents the projection from collapsing.

6. An energy absorber which is formed by vacuum-molding a resin sheet, and is for installation between an auto body panel and an interior member, so as to absorb impact energy of a collision, the energy absorber comprising:
    a resin base configured to be fastened between the auto body panel and the interior member; and
    a plurality of projections which projects from the base, and is formed into a hollow conical shape or a hollow circular truncated cone shape, wherein the plurality of projections has different heights and different number of linear ribs, one of the ribs projecting from an outer circumferential face of the projection and extending from a leading end of the projection to the base, the ribs of the projections next to each other are spaced apart, and the two adjacent ribs of the projections next to each other are offset from a line connecting the centers of the projections.

7. The energy absorber according to claim 6, wherein the base, the projections and the rib are formed of a material having a polypropylene as a main material.

8. The energy absorber according to claim 6, wherein the base includes a collapse preventing portion which prevents the projection from collapsing.

9. The energy absorber according to claim 6, wherein the number of the ribs and a position of the rib to be provided on the projection are arbitrarily set.

10. The energy absorber according to claim 9, wherein the base includes a collapse preventing portion which prevents the projection from collapsing.

* * * * *

(12) EX PARTE REEXAMINATION CERTIFICATE (9920th)
United States Patent
Tauchi et al.

(10) Number: US 8,056,962 C1
(45) Certificate Issued: Nov. 5, 2013

(54) ENERGY ABSORBER

(75) Inventors: Hideki Tauchi, Nagoya (JP); Toshihiro Takai, Aichi (JP); Kenichi Mizoguchi, Aichi (JP); Hideki Usami, Aichi (JP); Kazunori Teramoto, Aichi (JP)

(73) Assignee: White Impact Co., Ltd., Chikusa-Ku, Nagoya-Shi, Aichi (JP)

Reexamination Request:
No. 90/012,682, Sep. 15, 2012

Reexamination Certificate for:
Patent No.: 8,056,962
Issued: Nov. 15, 2011
Appl. No.: 12/744,038
Filed: May 20, 2010

(21) Appl. No.: 90/012,682

(22) PCT Filed: Mar. 12, 2010

(86) PCT No.: PCT/JP2010/054221
§ 371 (c)(1),
(2), (4) Date: May 20, 2010

(87) PCT Pub. No.: WO2010/134377
PCT Pub. Date: Nov. 25, 2010

(30) Foreign Application Priority Data

May 22, 2009 (JP) ................................ 2009 1 24513

(51) Int. Cl.
*B60R 21/04* (2006.01)
*B60R 13/02* (2006.01)
*F16F 7/12* (2006.01)

(52) U.S. Cl.
USPC ........ 296/187.05; 280/751; 428/178; 428/180

(58) Field of Classification Search
USPC ............... 296/187.05; 280/751; 428/178, 180
See application file for complete search history.

(56) References Cited

To view the complete listing of prior art documents cited during the proceeding for Reexamination Control Number 90/012,682, please refer to the USPTO's public Patent Application Information Retrieval (PAIR) system under the Display References tab.

*Primary Examiner* — Matthew C. Graham

(57) ABSTRACT

An energy absorber in which an energy-absorbing property in a collision can be set to a predetermined property is provided. An energy absorber (1) which is installed between an auto body panel and an interior member of an automobile, so as to absorb impact energy of a collision includes a base (2) which is fastened between the auto body panel and the interior member; and a plurality of projections (3) which projects from the base and is formed into a hollow conical shape or a hollow circular truncated cone shape, wherein the plurality of projections has different heights and different number of liner convex ribs (4), the rib projecting from an outer circumferential face of the projection and extending from a leading end of the projection to the base, the projections next to each other are not coupled via the rib, and the rib is not provided on a line connecting the centers of the projections next to each other.

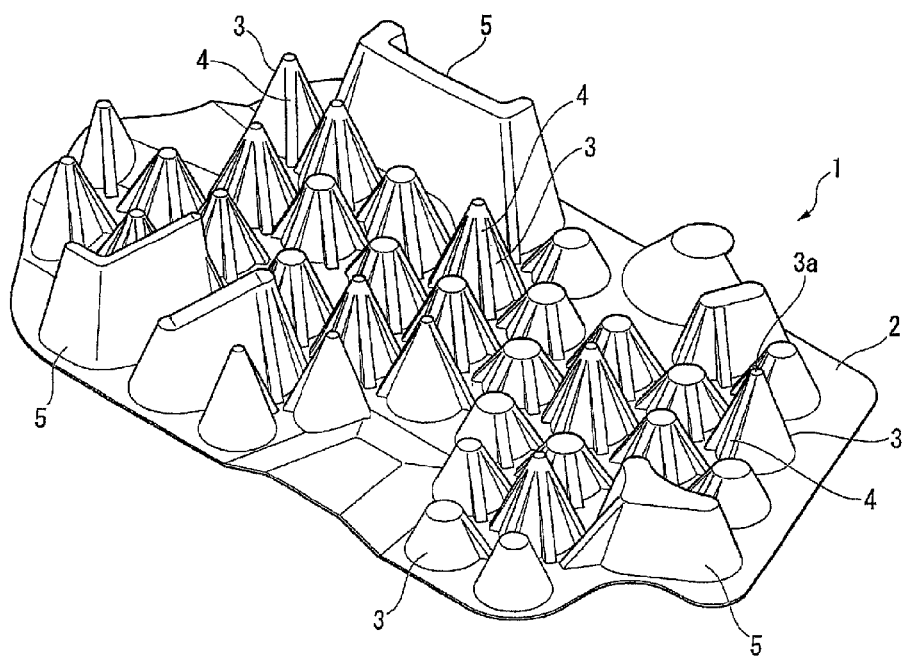

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 6, between lines 21 and 22:

*According to one aspect of this disclosure, the plurality of projections 3 includes conical projections that each have a hollow conical shape. According to another aspect of this disclosure, each of the conical projections 3 includes a vertex (FIG. 1) pointed away from the base 2. According to another aspect of this disclosure, the height of the conical projections from the base 2 is greater than the height of circular truncated cone shaped projections from the base 2. According to another aspect of this disclosure, a first one of the plurality of projections 3 has a first number of ribs 4, and a second one of the plurality of projections 3 has a second number of ribs 4, and the second number is different from the first number.*

*According to another aspect of this disclosure, the plurality of projections 3 project from the base 2 in a first direction (FIG. 1), and the collapse preventing portion 5 projects from the base 2 in the first direction. According to another aspect of this disclosure, the plurality of projections 3 have a width, and the collapse preventing portion 5 has a width that is greater than the width of the plurality of projections 3.*

*According to another aspect of this disclosure, the collapse preventing portion 5 and the base 2 are configured such that the base 2 does not bend or buckle. Since the collapse preventing portion 5, which prevents the projection 3 from collapsing, is formed on the base 2, the base 2 does not bend or buckle.*

*This disclosure also relates to a method of making a resin product. The method includes the steps of providing the energy absorber 1 (FIG. 1), and forming the base 2 and the plurality of projections 3 by vacuum-molding a resin sheet. According to another aspect of this disclosure, the method includes the step of forming a collapse preventing portion 5 which prevents a projection 3 from collapsing.*

*According to another aspect of this disclosure, a car door includes an auto body panel, an interior member, and the energy absorber 1. According to another aspect of this disclosure, the energy absorber 1 is fastened within the car door and located between the auto body panel and the interior member, and the plurality of projections 3 are directed inwardly from the base 2 and toward the interior member, such that the plurality of projections 3 are located between the base 2 and the interior member.*

AS A RESULT OF REEXAMINATION, IT HAS BEEN DETERMINED THAT:

The patentability of claims 1-10 is confirmed.

New claims 11-14 are added and determined to be patentable.

11. The energy absorber according to claim 10, wherein the plurality of projections project from the base in a first direction, and wherein the collapse preventing portion projects from the base in the first direction, and wherein the plurality of projections have a width, and wherein the collapse preventing portion has a width that is greater than the width of the plurality of projections, and wherein the collapse preventing portion and the base are configured such that the base does not bend or buckle.

12. The energy absorber according to claim 3, wherein the plurality of projections project from the base in a first direction, and wherein the collapse preventing portion projects from the base in the first direction.

13. The energy absorber according to claim 12, wherein the plurality of projections have a width, and wherein the collapse preventing portion has a width that is greater than the width of the plurality of projections.

14. The energy absorber according to claim 1, wherein the energy absorber is configured to be fastened within a car door and located between an auto body panel and an interior member of the car door, such that the plurality of projections are directed inwardly from the base and toward the interior member, and such that the plurality of projections are located between the base and the interior member.

\* \* \* \* \*